(12) United States Patent
Chowdhary et al.

(10) Patent No.: US 12,070,691 B2
(45) Date of Patent: *Aug. 27, 2024

(54) SYSTEMS AND METHODS FOR CAPTURE AND USE OF LOCAL ELEMENTS IN GAMEPLAY

(71) Applicant: ImagineAR, Inc., Vancouver (CA)

(72) Inventors: Yousuf Chowdhary, Maple (CA); Jeffrey Brunette, Aurora (CA); Ravinder ("Ray") Sharma, Toronto (CA)

(73) Assignee: ImagineAR, Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,206

(22) Filed: Jun. 2, 2023

(65) Prior Publication Data

US 2024/0100437 A1 Mar. 28, 2024

Related U.S. Application Data

(63) Continuation of application No. 17/952,026, filed on Sep. 23, 2022, now Pat. No. 11,666,827.

(51) Int. Cl.
*A63F 13/65* (2014.01)
*A63F 13/216* (2014.01)
*A63F 13/327* (2014.01)
*A63F 13/33* (2014.01)
*A63F 13/60* (2014.01)

(52) U.S. Cl.
CPC ............ *A63F 13/65* (2014.09); *A63F 13/216* (2014.09); *A63F 13/327* (2014.09); *A63F 13/33* (2014.09); *A63F 13/60* (2014.09); *A63F 2300/205* (2013.01); *A63F 2300/206* (2013.01); *A63F 2300/8082* (2013.01)

(58) Field of Classification Search
CPC ...... A63F 13/65; A63F 13/216; A63F 13/237; A63F 13/33; A63F 13/60; A63F 2300/205; A63F 2300/206; A63F 2300/8082
See application file for complete search history.

(56) References Cited

U.S. PATENT DOCUMENTS

2011/0183754 A1* 7/2011 Alghamdi ............... A63F 13/49
463/31
2013/0079144 A1* 3/2013 Ahmed .................. A63F 13/216
463/42

* cited by examiner

*Primary Examiner* — Thomas H Henry
(74) *Attorney, Agent, or Firm* — Frank A. Bruno, Esq.; White and Williams, LLP

(57) ABSTRACT

A computer-implemented method is provided for enabling virtual gameplay. Access is provided to at least one video game in which a player is able to interact with the video game according to a storyline. A player location is detected and stored. A local element is retrieved from a database based on the player location and the local element is correlated to a local element script actuatable in the video game. This local element script is retrieved and actuated in the video game to supplement or replace the video game's storyline.

28 Claims, 4 Drawing Sheets

SYSTEMS AND METHODS FOR CAPTURE AND USE OF LOCAL ELEMENTS IN GAMEPLAY

CROSS-REFERENCE TO RELATED APPLICATIONS

This application is a continuation of U.S. patent application Ser. No. 17/952,026, filed Sep. 23, 2022, now U.S. Pat. No. 11,666,827, which is a continuation of U.S. patent application Ser. No. 17/172,623 filed Feb. 10, 2021, now U.S. Pat. No. 11,484,797, which is a continuation of U.S. patent application Ser. No. 15/215,406 filed Jul. 20, 2016, now U.S. Pat. No. 10,946,284, which is a continuation of U.S. patent application Ser. No. 14/084,113, filed Nov. 19, 2013, now abandoned, which claims the benefit of U.S. Provisional Patent Application Ser. No. 61/796,715, filed Nov. 19, 2012, the contents of which applications are hereby incorporated by reference in their entirety.

FIELD OF INVENTION

The present invention is related to video game applications in general and video game applications for the capture and use of local elements to impact gameplay in particular.

BACKGROUND

A virtual world is a computer simulated environment. A virtual world may resemble the real world, with real world rules such as physical rules of gravity, geography, topography, and locomotion. A virtual world may also incorporate rules for social and economic interactions between virtual characters. Player (users) may be represented as avatars, two or three-dimensional graphical representations. Virtual worlds may be used for massively multiple online role-playing games, for social or business networking, or for participation in imaginary social universes.

Prior art virtual worlds have storylines that are either static or branch in a rather predictable fashion. Prior art methods for a branching storyline are well known in the industry, where the outcome of one encounter defines the starting point of the next. Such virtual worlds have a set number of possible branches and a player's skills, interaction with other players and non-player characters (NPCs) aids in the creation of variety and new possibilities. Mostly, the storyline is also dependent on the virtual character (Player Character) that a player chooses to engage in the gameplay of the virtual world.

These existing virtual worlds lack the ability to take the player's location and its various local elements into account for meaningful impact on gameplay. By overcoming these limitations, the present invention allows for a richer and more unique gameplay experience for each player.

SUMMARY OF THE INVENTION

A player's real world location may have a significant meaning for the player, and thus an emotional bond may already exist. By exploiting this emotional bond and making the storyline of a virtual world dependent on the local elements a more interesting and meaningful experience can be provided. Thus a player may be willing to spend more time engaging with a virtual world when the virtual world's storyline is impacted by the changing local elements. Likewise, a player may enjoy the option to choose a real world location and interact with a virtual world impacted by local elements of that chosen location.

This application describes systems and methods whereby the storyline of a virtual world may change based on the real world local elements of a particular location. Thus changes to the real world local elements may influence the gameplay of a virtual world. Local elements may include but are not limited to weather e.g. storms, hurricanes; social and political environments like political and social unrest, protest, peaceful rallies, marathon runs, local festivals, stock market ups/downs and crashes, elections whether local, state or nation level, local robberies, crime and heists, mafia and related incidents, traffic congestion, accidents, construction, construction related delays etc. derived from the location.

In one embodiment of the invention there may be virtual characters associated with each of the changing local elements. For example as a result of political and social unrest in the real world, an element of chaos may be introduced (e.g. bringing hordes of NPCs into the virtual world to reflect real life). Thus there may be predefined scripts incorporated in the virtual world, each script may be associated with a different local element, and upon encountering such a local element the relevant script is called into play impacting the storyline of the virtual world.

In one single-player embodiment the virtual characters that are available to the player are dependent on the local elements of the location of the player. In another multi-player embodiment the location of each player then introduces virtual characters associated with the local elements of these real world locations. Thus depending on who is playing from where, the storyline keeps changing, since the combination of virtual characters changes based on the real world local elements of the location of the players.

In one embodiment of the invention, the items and loot that the players may come across, monsters and enemies that they may fight, traps and puzzles that they may have to overcome may vary based on the changing local elements of real world location(s).

The term "storyline" may include, but is not necessarily limited to, the aesthetics, virtual characters that are available, plot, set of plot nodes, scene, settings etc. and may change individually or in combination with the location of the player. Storylines can change, evolve, branch or morph based on the changes in the local elements. Alternate settings may be applied, alternate levels may be offered for gameplay based on these changes.

Using the methods and systems disclosed in this application the local elements of the real world, location(s) become a vital factor impacting the storyline of the virtual world. This provides for a richer gaming experience and increases player engagement while making the gameplay of the virtual world more unique for each player.

According to a first aspect of the invention, a computer-implemented method is provided for enabling virtual gameplay on a computing device in communication with a storage means. Access is provided to at least one video game in which a player is able to interact with the video game according to a storyline. A player location is detected or input at the computing device and the location is stored on the storage means. A local element is retrieved from a database using the computing device based on the player location. The local element is correlated to a local element script actuatable in the video game. The computing device is used to retrieve and actuate the local element script in the video game, such that the local element script supplements or replaces the storyline.

A second or subsequent location may be detected in the course of gameplay. In this case, a second or further local element script may be retrieved that is related to the second or subsequent location and its local element.

The correlating of the local element preferably takes account of an operating context within the game. Operating context refers to internal and/or external factors impacting a particular system, device, application, business, organization etc. For example, operating context for an application is the external environment that influences its operation. For a mobile application, the operating context may be defined by the hardware and software environment in the device, the target user, and other constraints imposed by various other stakeholders. In the case of the present invention, operating context may have a bearing on, for example, the selection of the local element for the detected location (e.g. selecting a kid-appropriate local element to be introduced in a game for kids).

Preferably, the video game includes at least one virtual character. The local element script may be used to modify the virtual character's appearance, facial or body expression or health. Or it may be used to modify the tools, weapons, equipment or clothing of the virtual character. It may be used to modify character statistics of a virtual character. For example, the local element may be used to determine an overall mood or tension of a location. In this case, the local element script may be used to modify character statistics representing mood or aggression in the virtual character.

Preferably, the storyline comprises one or a combination of plot, plot nodes, character interactions, encounters, scene, setting, aesthetics, levels, premise, or theme. The local element script may be used to specifically modify the scene or setting of the storyline. In one example, the local element script may be used to modify or introduce non-player characters, game monsters, enemies, traps or puzzles corresponding to the local element.

The local element may include one or a combination of local events, local indicators, and local celebrities or news figures.

The local element may be a local news item. The local element script may be used to modify the storyline to reflect that news item. For example, if the news item refers to a crowd of people, the local element script may introduce a crowd of non-player characters into the storyline.

The local element may be a weather, social, political, economic, stock market, demographic, traffic, crime, or construction indicator relevant to the location. The local element script may be used to modify the storyline to reflect that indicator.

The local element may be a local celebrity or news figure, in which case, the local element script may modify the storyline to introduce a non-player character representing that local celebrity or news figure.

The local element may include a keyword extracted from a news stream of local news items. This can be used, generically or specifically, to match to a profile and a specific script to modify gameplay.

The location may be re-detected at intervals, and in the event of a change in the location, a virtual character is shown moving to a new scene in the storyline.

If a null location is detected or the detected location is unsupported, a default or random storyline may be provided. Or, a player may be asked to input or select a location. An approximate match can also be used.

Preferably, the storage means is provided by one or a combination of: a local fixed memory, a local removable memory, a remote fixed memory, a remote removable memory, and a virtual memory. The storage means may be selected from the group consisting of: a local data storage of a game console, a local inbuilt memory, a user provided memory, an online server, and a shared folder on a network.

Preferably, the detecting step includes retrieving player location from a sensor. In one embodiment, the player is enabled to play the game using a game device, and the player location may be detected by an on-board sensor on the game device (e.g. a mobile device).

Preferably, the detecting step includes retrieving player location from one or a combination of GPS, A-GPS, WiFi, IP address, account or billing address, and player provided location information. The player provided location information may be a fantasy location.

The detecting step may further include retrieving at least one map from a map database in response to the detected location.

The location may be detected at login or during gameplay.

DETAILED DESCRIPTION

Figure 1:
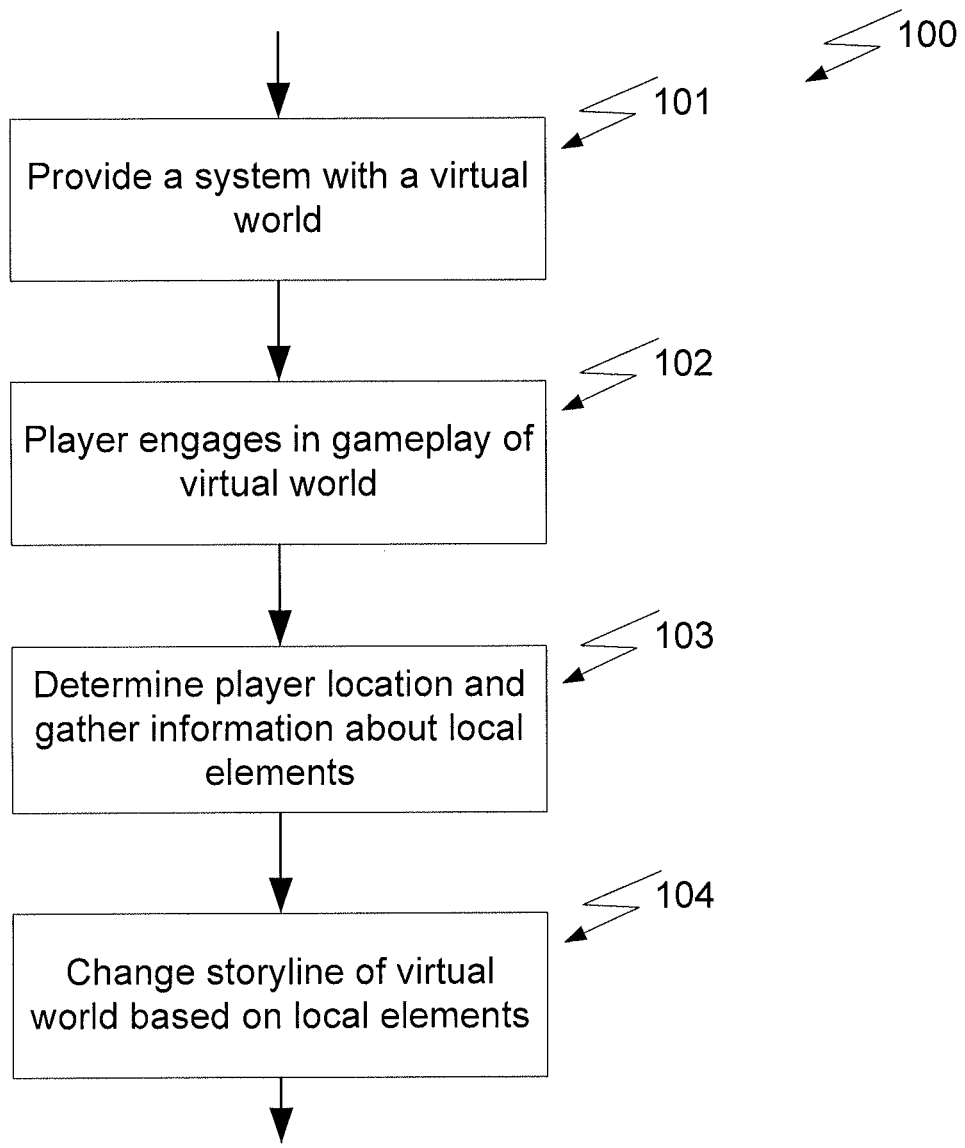
FIG. 1 is a flow diagram illustrating the primary steps of the method, according to a preferred embodiment.

Methods and arrangements of changing storyline for gaming applications and virtual worlds based on local elements are disclosed in this application.

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer or mobile device like a Smartphone, tablet e.g. iPad through any type of network, including a local area network (LAN) or a wide area network (WAN), or the connection may be made to an external computer (for example, through the Internet using an Internet Service Provider).

A "virtual world" as used herein need not be a "game" in the traditional sense of a competition in which a winner and/or loser is determined, but rather that the term "game" incorporates the idea of a virtual world. Moreover, a person or entity who enters the virtual world in order to conduct business, tour the virtual world, or simply interact with others or the virtual environment, with or without competing against another person or entity is still considered to be "playing a game" or engaging in the gameplay of the game.

Virtual worlds can exist on game consoles for example Microsoft Xbox, and Sony Playstation, Nintendo Wii, etc., or on online servers, or on mobile devices (e.g. an iPhone or an iPad), Smartphones, portable game consoles like the Nintendo 3DS, or on a PC (personal computer) running MS Windows, or MacOS, Android, Ubuntu, Linux or another operating system. This list is not exhaustive but is exemplary of devices or computing environments where virtual worlds can exist, many other variations are available and known to persons skilled in the art.

A computer or a game console that enables a user to engage with a virtual world, including a memory for storing a control program and data, and a processor (CPU) for executing the control program and for managing the data, which includes user data resident in the memory including a set of gameplay statistics. The computer, or a game console, may be coupled to a video display such as a television, monitor, or other type of visual display while other devices may have it incorporated in them (iPad). A game or other simulations may be stored on a storage media such as a DVD, a CD, flash memory, USB memory or other type of memory media. The storage media can be inserted to the console where it is read. The console can then read program instructions stored on the storage media and present a game interface to the user.

Typically, a user or a player manipulates a game controller to generate commands to control and interact with the virtual world. The game controller may include conventional controls, for example, control input devices such as joysticks, buttons and the like. Using the controller a user can interact with the game, such as by using buttons, joysticks, and movements of the controller and the like. This interaction or command may be detected and captured in the game console. The user's inputs can be saved, along with the game data to record the game play. In one embodiment, the gameplay data can include usage statistics captured to record the user's experience as they progress from one level of the game to the next.

The term "player" is intended to describe any entity that accesses the virtual world, regardless of whether or not the player intends to or is capable of competing against other players. Typically, a player will register an account with the game console within a peer-to-peer game and may choose from a list or create virtual characters that can interact with other virtual characters of the virtual world.

The term "engage in gameplay" generally implies playing a game whether it is for the purpose of competing, beating, or engaging with other players. It also means to enter a virtual world in order to conduct business, tour a virtual world, or simply interact with others or a virtual environment, with or without competing against another entity.

A "virtual character" may include a persona created by a player or chosen from a list in the virtual world. Typically virtual characters are modeled after the humans whether living or fantasy (e.g. characters from mythology).

A virtual character is represented by one or more gameplay statistics, which encapsulate some meaning to connect the virtual (and digital) reality of the game to the real world. Many of these statistics are not apparent to the user as such, but are instead encoded within the framework of the game or composed together to form a script. In role-playing games (RPGs) and similar games, these statistics may be explicitly exposed to the user through a special interface, often with added meaning which provides context for the user's actions.

In virtual worlds (video/computer games) a non-player character (NPC) is a virtual character that is controlled by the program and not a player. NPC may also refer to other entities not under the direct control of players. NPC behavior in a virtual world may be scripted and automatic. The scripted and automatic behavior of NPCs may change with the changing local elements thus in turn impacting the storyline of the virtual world.

A "player character" or "playable character" (PC) is a virtual character in a virtual world that is controlled or controllable by a player. A player character is a persona of the player who controls it. In some cases a virtual world has only one player character and in other cases there may be a small number of player characters from which a player may pick a certain virtual character that may suit his or her style of gameplay, while in other scenarios there may be a large number of customizable player characters available from which a player may choose a virtual character of their liking. An avatar—may include the physical embodiment of a virtual character in the virtual world.

For the purpose of this application the term "story" may mean storyline, plot nodes, virtual character(s), set of virtual characters or character interaction, encounters, settings, aesthetics, levels, premise or theme amongst other things. The intent is to cover all such areas that may be impacted by the location of the player, and are known to persons skilled in the art. Some of these terms are explained in more detail below.

Plot

A "plot" defines the events a story comprises, particularly as they relate to one another in a pattern, a sequence, through cause and effect, or by coincidence. A well thought through plot with many different patterns of events results in a more engaging and interesting game. A plot may have a beginning, a middle, and an end, and the events of the plot may causally relate to one another as being either dependent or probable. A plot may also refer to the storyline or the way a game progresses. Similarly a storyline may refer to a plot or a subplot of a virtual world. Thus for the purpose of this application the terms plot and storyline may be used interchangeably.

Plot Node

In a virtual world a "plot node" may be defined as a forking point in the storyline where the plot of the story can diverge based on the decisions a player makes, or the location of the player.

Plotline—Set of Plot Nodes

"Plotline" can be considered a certain sequence of interconnected plot nodes, while a set of plot nodes may or may not be interconnected. A plotline may be integral to the main storyline or may be complimentary and thus provide extra possibilities in terms of virtual character interaction and specific scenarios. Thus there may be a certain association between a certain local element and a plotline or a certain set of plot nodes. Therefore when a player from a certain location with certain local element(s) joins the gameplay, the plotline or set of plot nodes associated with this local element(s) may become incorporated into the gameplay.

Encounters

In a virtual world an "encounter" may be defined as a meeting between two or more virtual characters or may be thought of as a decision point at which a player encounters an opposing element (e.g. an enemy). An encounter may be player initiated (actively engaging in fighting an enemy) or unwanted by the player. A player may opt to avoid an encounter or may actively engage in them to move to the next level of the virtual world. The outcome of the encounters may at times define how the rest of the game progresses.

A "random encounter" is a feature commonly used in various role-playing games (RPGs) whereby an encounter with a non-player character (NPC), an enemy, a monster, or a dangerous situation occurs sporadically and at random. Random encounters are generally used to simulate the challenges associated with being in a hazardous environment, such as a monster-infested wilderness or dungeon usually with an uncertain frequency of occurrence to simulate a chaotic nature.

Premise

The "premise" of a game or concept statement is a short, direct description of the situation of a game and describes the fundamental concept that drives the plot. The premise determines the primary goals of the virtual characters of a virtual world, the opposition to these goals and typically may define the means and the path that these virtual characters may take in achieving those goals. The primary objective is usually sought by both the protagonist (hero) and the antagonist (villain) but may only be achieved by one of them.

Theme

A "theme" is the main idea, moral, or message, of a game. It is typically the common thread or oft repeated idea that is incorporated throughout a game. Examples of themes in games: espionage-themed role-playing game, martial arts—themed iPod based game, single-player horror-themed PC adventure game, fantasy-themed role-playing game, science fiction themed computer game, adult-themed video game, a horror-themed FPS (first person shooter) video game, futuristic-themed competitive fighting game, paranormal investigation-themed role-playing game etc.

Settings

"Settings" in the virtual world control multiple areas of the virtual world (game). Settings may be changed by a player or may be impacted by the local elements of the location of a player.

Levels

A "level" in the virtual world (video game) terminology refers to a discrete subdivision of the virtual world. Typically a players begins at the lowest level (level 1), and proceeds through increasingly numbered levels, usually of increasing difficulty, until they reach the top level to finish the game. In some games levels may refer to specific areas of a larger virtual world, while in other games it may refer to interconnected levels, representing different locations within the virtual world.

Statistics (Stat)

A "statistic" (stat) in role-playing games (RPG) is a datum which represents a particular aspect of a virtual character. Most virtual worlds separate statistics into several categories. The set of categories actually used in a game system, as well as the precise statistics within each category may vary greatly from one virtual world to another. Many virtual worlds also use derived statistics whose values depend on other statistics, which are known as primary or basic statistics. Derived statistics often represent a single capability of the character such as the weight a character can lift, or the speed at which they can move. Derived statistics are often used during combat, can be unitless numbers, or may use real-world units of measurement such as kilograms or meters per second.

A virtual character's statistics affects how it behaves in a virtual world. For example, a well-built muscular virtual character may be more powerful and be able to throw certain virtual objects farther, but at the same time may lack dexterity when maneuvering intricate virtual objects. A virtual character may have any combination of statistics, but these statistics may be limited by either a hard counter, soft counter or a combination of both.

Most devices where virtual worlds exist provide a mechanism to save the state of the game, so that the game can be played from the same point where it was left off. Methods for saving the state of the game include but are not limited to the examples cited here, for example a gaming console may provide internal memory chips, or a port where a user can connect user supplied memory; while games played over the Internet may provide online memory. The aforementioned memory space can also be used for saving the different components of the storyline that are affected by the change in the real world location of the player to enhance the gameplay experience.

Script

A "script" defines the default behavior of a virtual character. Just as with statistics, different scripts can refer to different behaviors for the same virtual character.

FIG. 1 is a flow diagram illustrating the primary steps of the method, according to a preferred embodiment. A system is provided with a virtual world 101. The virtual world may be a single player game or a multiplayer game or a MMORPG (Massively Multiplayer Online Role Playing Game) and may exist on any type of a gaming device which may include but not limited to an iPhone, iPad, Smartphones, Android phones, personal computers e.g. laptops, gaming consoles like Nintendo Wii, Nintendo DS, Sony PlayStation, Microsoft Xbox 360, and online server based games etc.

The computer program comprises: a computer usable medium having computer usable program code, the computer usable program code comprises: computer usable program code for enabling change in storyline based on the real world location of a player, computer usable program code for presenting graphically to the player the different options available to modify and personalize different aspects of the virtual world including but not limited to settings.

The player engages in gameplay of the virtual world 102. As mentioned earlier, the term "engage in gameplay" generally implies playing a game whether it is for the purpose of competing, beating, or engaging with other players. It also means to enter a virtual world in order to conduct business, tour a virtual world, or simply interact with others or a virtual environment, with or without competing against another entity.

The player location is determined and information is gathered about local elements relevant to that location 103. As technology advances, more and more miniaturized electronic components become cost effective to be mass produced and included in all sorts of devices. Today many types of mobile devices e.g. Smartphones like iPhone include a built-in GPS sensor, have data coverage via mobile cellular network or WiFi, and are widely used for engaging in the gameplay of virtual worlds. Thus determining the player location is a well known method in the art. There may be other methods, well known in the art, to determine the player location, e.g. using the Wireless Assisted GPS (A-GPS), WiFi network, using IP address, player provided information, using billing address zip/area code, etc.

Similarly digital maps have become readily available e.g. Google Maps, Microsoft Bing Maps, etc. and once the GPS co-ordinates have been received from the GPS sensor can be used for identifying the location/geographic landscape and acquiring other information e.g. demographics of the location. Similarly weather information and local news are also readily available over the Internet. These news streams may be used for gathering the local elements of a location.

In one embodiment of the invention the location of the player is the real world location where the player is engaging in the gameplay. In an alternate embodiment the player may have defined the location e.g. a player is based in Seneca Falls, NY, but may have chosen to use the local elements of NY, NY. Or, the system may make such an approximation if there is no available local element data for Seneca Falls.

The storyline of the virtual world is then changed based on the local elements 104. Several exemplary methods are provided in this application for illustrative purposes. The application is not limited to these examples but in fact covers all combinations, permutations, variations etc. that may be obvious to the one skilled in the art.

Figure 2:
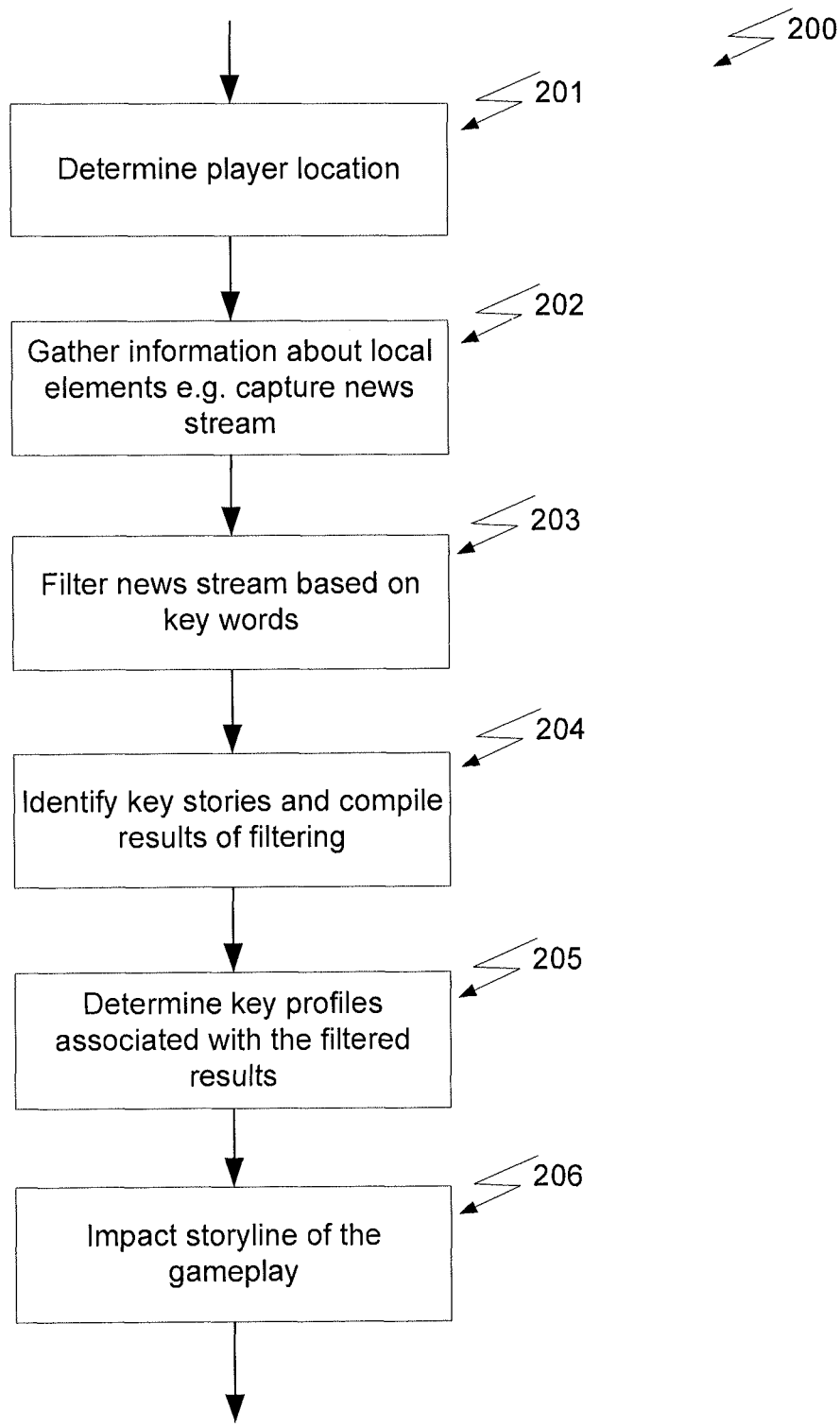
FIG. 2 is a flow diagram representing an example of filtering a news stream to impact storyline of gameplay.

FIG. 2 is a flow diagram representing an example of filtering a news stream to impact storyline of gameplay.

In one embodiment of the invention for a single player virtual world, there may be many variations of the virtual world such that each variation is associated with a profile, and certain real world elements that tend to occur in all places every now and then. For example severe weather, earthquakes, political, economic and social turmoil, protests, marathons, street festivals, traffic congestion, stock market rise and fall, food shortages, price hikes, each may be associated with a certain profile. There may be generic profiles that are associated with such elements in general, and there may be specific profiles that are associated with specific and unique real world local elements.

For example there may be generic profiles for severe weather, earthquakes, street festivals etc. such that when one such local element is in effect at a certain location the relevant variations of the virtual world may be applied, using a generic profile associated with such a local element.

Similarly there may be specific profiles for specific local elements for example Mardi Gras, New York Marathon, October Fest, etc. In one embodiment of the invention, when a player's location is determined by gathering location information from say the gaming device's built-in GPS sensor, and it is determined that the player is in a certain location where a particular local (event) element is taking place (e.g. player is in New Orleans, LA, and its Mardi Gras week) the relevant variation of the virtual world may be applied, using a particular profile. Each profile is implemented using a script.

Turning to the flow diagram in FIG. 2, the player location is determined 201. As mentioned earlier there are several well understood prior art methods for determining the player location.

Information about local elements is gathered, e.g. by capturing the local news stream 202. In a preferred embodiment of the invention, once the location of the player is determined, gathering information about local elements may involve going to local news website to obtain local information on events and happenings.

This gathered news stream can then be filtered based on key words 203. In a preferred embodiment of the invention, the captured news stream from the determined location of the player is filtered by key words. As explained earlier, a virtual world may have a certain set of scripts associated with generic profiles and particular profiles. The list of key words may be derived from the list of profiles, since the virtual world can only apply variations to the gameplay based on the scripts that it can handle. If new scripts are added then new key words associated with these scripts/profiles may also be added to the virtual world, expanding its scope. Key words may have a wide range e.g. severe weather, storms, record rainfall, flooding, murder, theft, mugging, rape, protests, election, etc.

Key stories related to the location may then be identified based on the key word filtering and these results of the filtering can be compiled 204. Stories can be associated with key words. For example, as in the table below, a list of profiles may be associated with key words, and the local news feed can then be filtered to find specific incidences of those key words. The profile may be triggered if the key words show up in the news feed.

| List of Profiles | Key Words | News Feed Filter |
| --- | --- | --- |
| Fire in the City | FIRE, BLAZE | Warehouse blaze |
| Theft in the City | THEFT, ROBBERY, HEIST | |
| Murder in the City | MURDER, KILLING | |

In this case, the news feed filter found an item that matched the key word "blaze", so the "Fire in the City" profile would be selected to be implemented using local element scripts.

Key profiles are determined that are associated with the filtered results 205. In one embodiment of the invention each profile may be associated with one or more scripts.

A script defines the default behavior of a virtual character. Just as with statistics, different scripts can refer to different behaviors. Using the method and system of the invention, a default script of a virtual character may define its default behavior and in order to implement an altered behavior associated with a change in the local elements of a location a certain other script may be used instead of the default script of a virtual character.

In one embodiment script(s) may be associated with certain local element(s), and these scripts may already be embedded in a virtual world (game), but are dormant and may get invoked once a local element meets the criteria to call this script. In one embodiment there may be generic scripts associated with generic local elements, e.g. stormy weather, traffic congestion, murder, robbery, etc. Thus the appropriate script may be called into the game based on the local elements of a location. These changes in the scripts may be made periodically e.g. once a day, or may get changed with the changing local elements in real time e.g. several times a day.

In one embodiment the local elements of the player location may be used to define the Player Character(s), some or all Non-Player Characters (NPCs), and certain sets of plot nodes, levels, or encounters. Thus when a player engages in gameplay with a certain set of local elements, the Player Character (PC) may have certain characteristics that are based on these local elements. The system may also load a certain type of NPCs. The number of NPCs itself may also vary with the local elements e.g. when there is a protest in the real world location of the player, a large number of NPCs may appear in the virtual world and may engage in destructive behavior and a certain set of plot nodes associated with this situation may be loaded in the game.

In another embodiment with the change in local elements, the system of the invention may import scripts associated with this local element, so that the resulting gameplay is varied and thus more sophisticated.

In yet another embodiment the scripts associated with different profiles for the local elements may be downloaded (either automatically or upon player request) from a central server that acts as a repository for additional scripts. In another embodiment the user may have to pay when acquiring these additional scripts e.g. from a remote server.

The scripts are used to impact the storyline of the gameplay 206. In one embodiment of the invention for a single player virtual world as the local elements change so does the storyline of the virtual world.

In another embodiment of the invention, the different Player Characters, Non-Player Characters, and settings for virtual character statistics may also vary with the changing local elements. For example the personalities of virtual characters when playing the game in New Orleans during Mardi Gras week may be more playful as opposed to the same game when played in New York, NY after a string of murders so that the personalities of virtual characters may be more violent.

Such an affect can be achieved by having different stats for the PCs and NPCs, such that one set of stats is associated with a certain type of local element while another set of stats is associated with another type of local element. Thus by having different sets of stats, each associated with a certain local element, the same Player Character or NPC can exhibit a different behavior/personality.

In one embodiment, a player logs on the gaming server, a set of plot nodes associated with the local element(s) of the player location may now become available to the other players engaged in the gameplay of the virtual world. When another player logs off, the set of plot nodes associated with that particular location's local elements may now be unavailable to the players still playing the game. Thus the gameplay changes as player from diverse real world locations with varying sets of local elements engage and disengage in the gameplay of the virtual world.

In one embodiment of the invention impact to the storyline may be made by loading the script(s) associated with the identified local element(s). These scripts may be already imbedded in the game, but dormant till called. New scripts for changing local elements may be added to the game by the game developer or players to reflect new scenarios, thus expanding the scope of the game.

The occurrence and outcome of special bonus features, the amounts wagered on any bets, the outcomes for any intermediate game stages, the results of any player decisions made during the game, bonus plays and their outcomes, the final game outcomes etc. may also change based on the local elements of the location of the player.

In one embodiment of the invention extra points and lives are either granted or deducted when certain local elements change and warrant a change in the virtual world. For example the real world stock market of the location where the player is located has gone up, thus the player may be given extra lives. While a loss in the stock market may be reflected with the deduction of points and lives. Similarly if the interest rates on loans go up in the real world, the assets of the virtual characters may get devalued in the virtual world.

Figure 3:
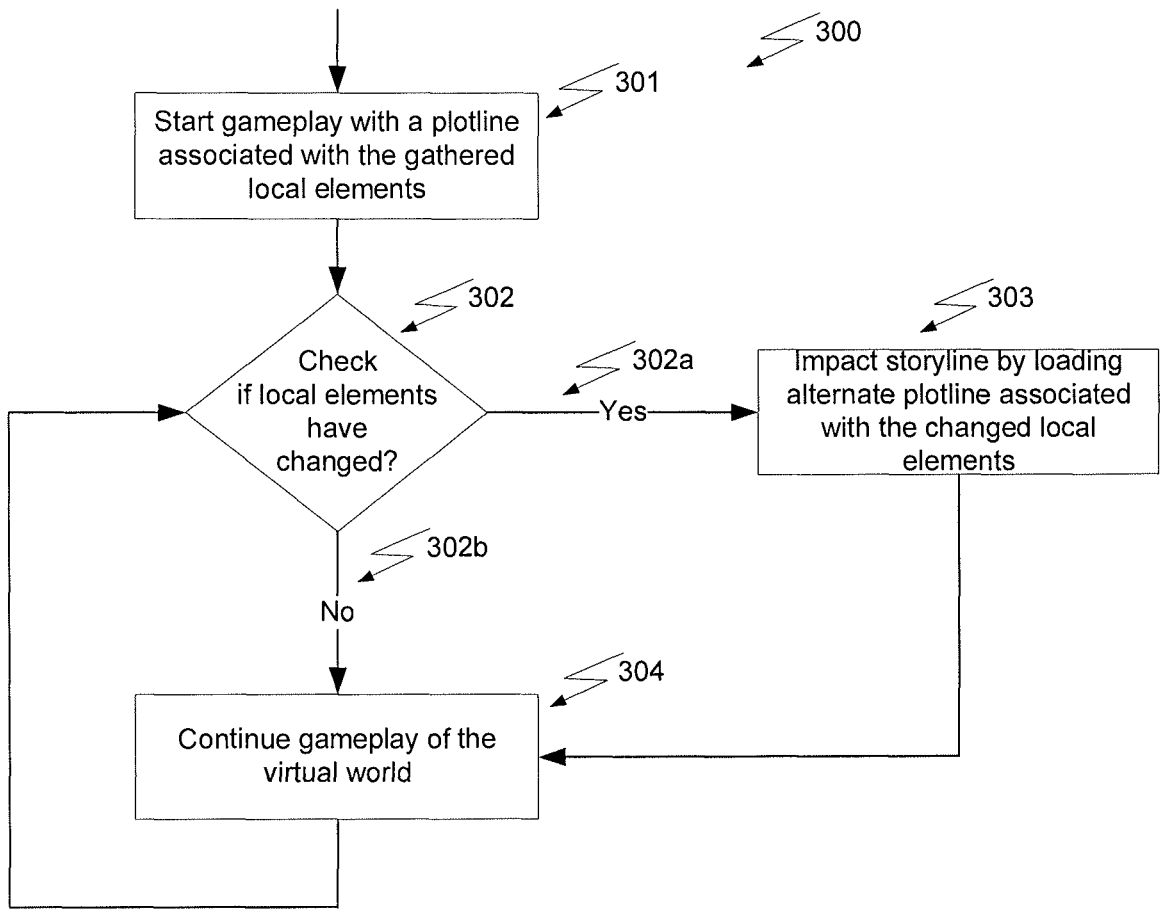
FIG. 3 is a flow diagram representing an example of ongoing location detection to impact storyline based on changed local elements.

FIG. 3 is a flow diagram representing an example of ongoing location detection to impact storyline based on changed local elements. As shown, gameplay starts with a plotline associated with the gathered local elements 301.

The system checks whether the local elements have changed 302. In order to determine the changes in local elements the original profiles and associated key words may be stored in a file or a database, and the new ones compared with the ones already stored. In a preferred embodiment, this comparison may be done on an as needed basis, preferably on a periodic basis, such that the frequency may be selectable by the player or the game developer. In another embodiment this comparison is done in real time, i.e. news stream is filtered in real time and all changes to local elements applied thereafter.

If Yes 302*a* (i.e. the local elements have changed), then the system impacts the storyline by loading an alternate plotline associated with the changed local elements 303.

If No, 302*b* (i.e. there is no change to the local elements), then the system continues the gameplay of the virtual world unchanged 304.

Figure 4:
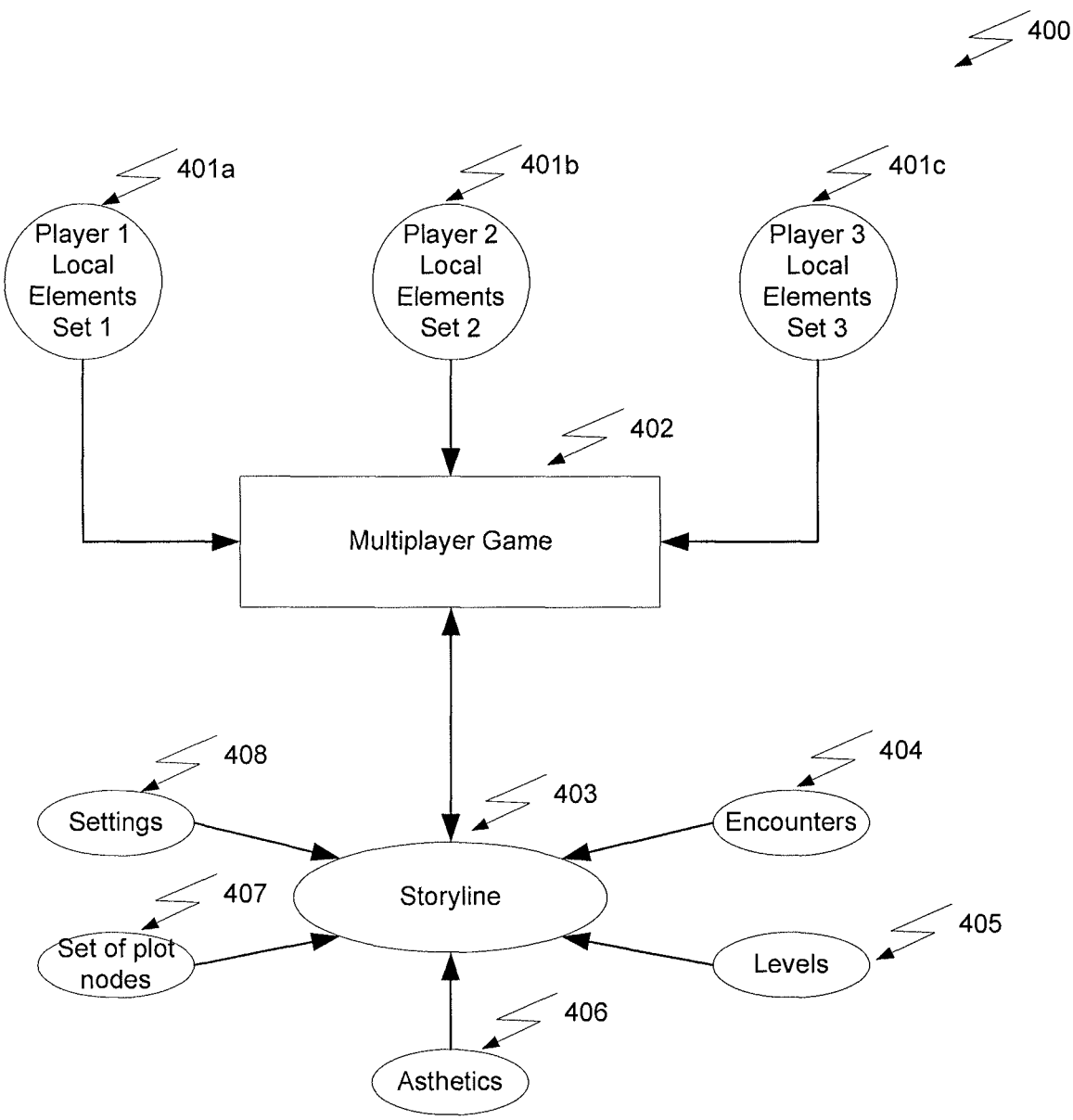
FIG. 4 is a conceptual diagram illustrating the interplay between multiple local elements and aspects of the storyline in a virtual world.

FIG. 4 is a conceptual diagram illustrating the interplay between multiple local elements and aspects of the storyline in a virtual world. FIG. 4 shows a sample multiplayer virtual world (game) 402 with Player1, located at real world location Location1, and having an associated set of local elements Set1 401*a*. Player2 is located at real world location Location2 and has associated set of local elements Set2 401*b*. Player3 is located at real world location Location3 and has associated set of local elements Set3 401*c*. These three players are engaged in the gameplay of the virtual world, in this case, a multiplayer game 402.

The storyline 403 of the multiplayer virtual world 402 may be composed of encounters 404, levels, 405, aesthetics 406, set of plot nodes 407 or settings 408 amongst other items described earlier in this application.

The storyline 403 may be impacted/changed by a change in any one of the encounters 404, levels, 405, aesthetics 406, set of plot nodes 407 and/or settings 408 based on the real world locations of the players engaged in the gameplay. The storyline 403 then in turn impacts the gameplay of the virtual world 402.

The storyline may be changed by changing the plot nodes or set of plot nodes, virtual character (both player characters and non-player characters), set of virtual characters or virtual character interaction, settings, aesthetics, levels, premise or theme, encounters, levels etc. Thus a change in the local elements of the player location may impact any one of the earlier mentioned variables. The application is not limited to the cited examples, but the intent is to cover all such areas that may be used in a virtual world to impact the storyline of a virtual world.

Several exemplary embodiments/implementations of the invention are given below. There may be other methods obvious to the ones skilled in the art, and the intent is to cover all such scenarios.

In one embodiment of the invention the encounters and their outcomes may change when certain local elements are found present. Elements of an encounter, such as opponent appearance or fighting style may tailor themselves to fit the changing local elements. For example on a hot muggy day the player's virtual character may need to shed his heavy clothing while on a cold snowy night the player's virtual character may need extra layers of clothing and may lose health points when sufficient clothing is not available; thus perhaps forcing virtual characters to steal clothing items from NPCs.

In some embodiments of the invention there may be long term changes in response to the change in local elements. For example in a certain city a local mayoral election is held and a new mayor is elected while at the same time new logging licenses are issued to the forestry industry. This may be reflected in the virtual world by the introduction of a very powerful villain who may not be defeated till the mayor is in office as an elected representative and the forests in the virtual world may be similarly reduced by simulating logging by NPCs.

In other embodiments of the invention there may be short term local elements like weather that may impact the gameplay such that the local weather conditions may be used to create the ambiance in the virtual world. Thus if it sunny and hot outside in the real world where the player is located, the same may be reflected in the virtual world, and the virtual characters may have to shed some layers of clothing to stay comfortable. Similarly, if it is raining in the location where the player is based, the virtual world may simulate a storm to emulate the real world. Thus the real weather may impact the storyline by either creating a similar or opposite weather in the virtual world. In another embodiment of the invention the weather forecast model may be used for changes to gameplay.

Let's take into consideration a more detailed example, one that is based on a weather related event that devastated many cities in North America, Hurricane Sandy in late October 2012. As the hurricane moved from one city to the other the locations in its path encountered varying degrees of damage and destruction and thus spawned some very local events (elements). In New York, NY there was wide spread flooding including flooding of major tunnels, deaths due to fire and flooding, stock markets were closed for a record time, subway closures, fires, evacuations, food and gas shortages, lack of public transport and resultant loss of work days. While in Toronto Canada, the same weather system had a lesser degree of effect but nevertheless brought strong winds, flying/falling debris, injuries and death due to the falling neon signs, uprooting of trees etc.

Thus two players playing the same game at the same time in the two above mentioned cities may experience two varying (albeit related) storylines. Therefore when playing a virtual world (game) one where this invention is implemented, a player in New York, NY may experience the ambiance of the game change to dark and stormy skies, rain and flooding which make certain bridges impassable in the game, a certain change in the behaviour of the virtual characters where they are suddenly more afraid, bunches of NPCs running randomly in confusion and panic, while the number of points required to acquire items may go up significantly for the duration of such an event etc.

While a player in Toronto, Canada playing the same game at the exact same time may experience stiff winds and fallen trees which may make getting from one point to another more difficult, flying and falling debris which has to be dodged in order to prevent injury and loss of health points etc.

In one embodiment of the invention relating to a MMORPG (Massively Multiplayer Online Role Playing Game) the local elements of the respective locations of the players engaged in the gameplay at any given time impacts the storyline. Thus for example certain branches of the storyline and/or set(s) of plot nodes may become available when players from a certain location are either logged in or logged off.

When a new player engages in gameplay of the MMORPG, gather player location information e.g. using the embedded GPS sensor of a gaming device, then gather the local elements associated with this location. There may be other methods for determining player location, e.g. using IP address, WiFi network location, AGPS and other well known techniques in the art.

The system checks to see if the local elements of above said player location are unique, i.e. if any other player from the same location is also engaged in the gameplay of the virtual world at the same time or another player from another location with similar local elements is engaged in the gameplay. If player location and its local elements are unique then the system may load alternate/complementary set of storyline plot nodes associated with these new local elements. Gameplay continues using the new information. If player location and its local elements are not unique then gameplay continues with no changes.

In an alternate embodiment a certain set of storyline plot nodes become unavailable when a player from a location with certain local elements engages in the gameplay of the virtual world.

In multiplayer virtual worlds as new players engage in the gameplay and as other disengage, the respective local elements of their respective locations may have a cumulative effect in changing the storyline of the virtual world.

In an alternate embodiment a certain set of storyline plot nodes may become available when a player from a certain location with certain local elements disengages in the gameplay of a virtual world.

In another embodiment the storyline of the virtual world may change with the change of local elements, such that the virtual character can skip levels, or move from one level to the other randomly, or the game may lock out odd or even number levels (or other combinations of levels) to change the storyline.

In yet another embodiment the aesthetics of the virtual world may change with the changing local elements of the real world location of the player. For example the background of a platform game may change depending on the location (city) of the player and its current local elements (e.g. stormy weather or clear blue skies).

In another embodiment the virtual character interaction may change with the changing local elements of the player location. For example when all is quiet in the city where the player is located (i.e. no local elements match the key words) the virtual character interaction is more subdued. By contrast, when the same city encounters a string of murders, the virtual character interaction may become more aggressive, and the associated dialogue may also change correspondingly. Such an embodiment can be implemented by having different scripts for the virtual characters, and changing the scripts with the changing local elements of the real world location of the player.

In one embodiment the theme of the game may change with the changing local elements. For example, the original theme may be an espionage theme. After news of a local murder, the theme of the game may change to a murder mystery (to solve the local case), or a horror theme.

In another embodiment the premise of the game may change with the changing local elements of a location. For example, the original premise may be a treasure hunt. After a kidnapping news item, the premise may change to a quest to find the victim of the kidnapping.

In another embodiment the storyline of the virtual world may have multiple forks with multiple possibilities, and each time the local elements of the player location change, a new path(s) may be chosen either randomly or based on a dice roll or based on a pre-configured setting or based on a player defined setting.

In another embodiment of the invention, the statistics of the player character (PC) and the non-player characters (NPC) may depend on the local elements of the player location and may change when these local elements changes.

For example, in one embodiment when a player engages in gameplay of a particular virtual world from a first location the stats for a PC are such that the virtual character is physically very strong but is less intelligent, while when the same player engages in the gameplay of the same virtual world from a second location, the stats for the same PC are such that the virtual character is now more intelligent but less strong physically. The change in virtual character statistics may either depend on predefined relationships or may depend on a dice roll or may be entirely random.

One embodiment of the invention may preferably also provide a framework or an API (Application Programming Interface) for virtual world creation that allows a developer to incorporate the functionality of a changing storyline based on the changing local elements of the player location. Using such a framework or API allows for a more uniform virtual world generation, and eventually allows for more complex and extensive ability to change storyline.

It should be understood that although the term game has been used as an example in this application but in essence the term may also imply any other piece of software code where the embodiments of the invention are incorporated. The software application can be implemented in a standalone configuration or in combination with other software programs and is not limited to any particular operating system or programming paradigm described here. For the sake of simplicity, we singled out game applications for our examples. Similarly we described users of these applications as players. There is no intent to limit the disclosure to game applications or player applications. The terms players and users are considered synonymous and imply the same meaning. Likewise, virtual worlds, games and applications imply the same meaning. Thus, this application intends to cover all applications and user interactions described above and ones obvious to persons skilled in the art.

Although virtual world storyline changes based on changing local elements of the player location have been exemplified above with reference to gaming, it should be noted that virtual worlds are also associated with many industries and applications. For example, virtual worlds can be used in movies, cartoons, computer simulations, and video simulations, among others. All of these industries and applications would benefit from a changing storyline based on changing local elements of the player location.

The examples noted here are for illustrative purposes only and may be extended to other implementation embodiments. While several embodiments are described, there is no intent to limit the disclosure to the embodiment(s) disclosed herein. On the contrary, the intent is to cover all alternatives, modifications, and equivalents obvious to persons skilled in the art.

What is claimed is:

1. A computer-implemented method of enabling virtual gameplay on a computing device in communication with a storage memory and a location sensor, the method comprising the steps of:
   providing access to a video game having a virtual character with a virtual character statistic in which a player in a real world player geographic location interacts with the video game and with other players in other real world player geographic locations playing other virtual characters having virtual character statistics;
   detecting with the location sensor the real world player geographic location of the player and storing the real world player geographic location in the storage memory;
   retrieving from a database a local element script associated with the real world player geographic location, the local element script actuatable in the video game to modify one or more of the virtual character statistic and a plot node; and
   retrieving from the database mapping information related to the real world player geographic location of the player and actuating the local element script in the video game while the player is interacting with the video game and the player's real world player geographic location is not represented by another player and not actuating the local element script when the player's real world player geographic location is represented by another player,
   wherein actuating the local element script comprises modifying the virtual character statistic of the player's virtual character and modifying one or more of a virtual character statistic and a plot node of at least one of the other players' virtual characters.

2. The method of claim 1, further comprising detecting a second or subsequent location in the course of gameplay, and retrieving a second or further local element script, the second or further local element script being related to the second or subsequent location.

3. The method of claim 1, wherein creation of the local element script takes account of an operating context within the game.

4. The method of claim 1, wherein the local element script modifies one or more of the virtual character's appearance, facial or body expression or health.

5. The method of claim 1, wherein the local element script modifies one or more of the virtual character's tools, weapons, equipment or clothing.

6. The method of claim 1, wherein the player is able to interact with the video game according to a storyline which comprises one or a combination of plot, plot nodes, character interactions, encounters, scene, setting, aesthetics, levels, premise, or theme.

7. The method of claim 6, wherein the local element script modifies the scene or setting of the storyline.

8. The method of claim 1, wherein the location is re-detected at intervals, and in the event of a change in the location, a virtual character is shown moving to a new scene in the storyline.

9. The method of claim 1, wherein if a null location is detected or the detected location is unsupported, a default or random storyline is provided.

10. The method of claim 1, wherein if the location does not match a local element in the database, an approximate match is used.

11. The method of claim 1, wherein the storage memory is provided by one or a combination of: a local fixed memory, a local removable memory, a remote fixed memory, a remote removable memory, and a virtual memory.

12. The method of claim 1, wherein the storage memory is one or more of a local data storage of a game console, a local inbuilt memory, a user provided memory, an online server, and a shared folder on a network.

13. The method of claim 1, wherein the player is enabled to play the game using a game device, and the player location is detected by an on-board sensor on the game device.

14. The method of claim 13, wherein the game device is a mobile device.

15. The method of claim 1, wherein the detecting step includes retrieving player location from one or a combination of GPS, A-GPS, WiFi, IP address, account or billing address, and player provided location information.

16. The method of claim 15, wherein the player provided location information is a fantasy location.

17. The method of claim 1, wherein the mapping information includes at least one map from a map database representing the detected location.

18. The method of claim 1, wherein the location is detected at login.

19. The method of claim 1, wherein the location is detected during gameplay.

20. The method of claim 1, further comprising retrieving from the database using the computing device a local element based on the real world player location.

21. The method of claim 20, wherein the local element is a local news item and the local element script modifies the storyline to reflect that news item.

22. The method of claim 21, wherein, if the news item refers to a crowd of people, the local element script introduces a crowd of non-player characters into the storyline.

23. The method of claim 21, wherein the local element comprises a keyword extracted from a news stream of local news items.

24. The method of claim 20, wherein the local element is a weather, social, political, economic, stock market, demographic, traffic, crime, or construction indicator relevant to the location, and the local element script modifies the storyline to reflect that indicator.

25. The method of claim 20, wherein the local element is a local celebrity or news figure, and the local element script modifies the storyline to introduce a non-player character representing that local celebrity or news figure.

26. The method of claim 20, wherein the local element is used to determine overall mood or tension of a location, and the local element script modifies character statistics representing mood or aggression in the virtual character.

27. The method of claim 20, wherein the local element script modifies or introduces non-player characters, game monsters, enemies, traps or puzzles corresponding to the local element.

28. The method of claim 20, wherein the local element comprises one or a combination of local events, local indicators, and local celebrities or news figures.

* * * * *